(12) United States Patent
Kopp et al.

(10) Patent No.: US 12,140,481 B2
(45) Date of Patent: Nov. 12, 2024

(54) PROTECTIVE CASING FOR VEHICLE TEMPERATURE SENSOR

(71) Applicant: SC2N, Creteil (FR)

(72) Inventors: Gabriel Kopp, Cergy Pontoise (FR); Aurélien Servettaz, Cergy Pontoise (FR); David Pradier, Cergy Pontoise (FR); Philippe Couasse, Cergy Pontoise (FR)

(73) Assignee: SC2N, Creteil (FR)

( * ) Notice: Subject to any disclaimer, the term of this patent is extended or adjusted under 35 U.S.C. 154(b) by 119 days.

(21) Appl. No.: 17/442,385

(22) PCT Filed: Mar. 25, 2020

(86) PCT No.: PCT/EP2020/058258
§ 371 (c)(1),
(2) Date: Sep. 23, 2021

(87) PCT Pub. No.: WO2020/193593
PCT Pub. Date: Oct. 1, 2020

(65) Prior Publication Data
US 2022/0178762 A1    Jun. 9, 2022

(30) Foreign Application Priority Data

Mar. 26, 2019  (FR) ........................... 1903137

(51) Int. Cl.
*G01K 1/08* (2021.01)
*H01R 13/40* (2006.01)
(Continued)

(52) U.S. Cl.
CPC ............. *G01K 1/08* (2013.01); *H01R 13/40* (2013.01); *H01R 13/405* (2013.01);
(Continued)

(58) Field of Classification Search
CPC .... H01R 13/40; H01R 13/405; H01R 13/415; H01R 13/665; H01R 13/6658; G01K 1/08; G01K 2205/00
(Continued)

(56) References Cited

U.S. PATENT DOCUMENTS 5,482,470 A * 1/1996 Atsumi ............. H01R 13/6315
439/246
5,951,305 A * 9/1999 Haba ...................... H01R 12/57
439/70
(Continued)

FOREIGN PATENT DOCUMENTS

CN          202840043 U    3/2013
DE          102017115976 A1    1/2018

OTHER PUBLICATIONS

International Search Report with Written Opinion issued in corresponding International Application No. PCT/EP2020/058258, mailed Apr. 8, 2020 (14 pages).

*Primary Examiner* — Gary F Paumen
(74) *Attorney, Agent, or Firm* — Osha Bergman Watanabe & Burton LLP

(57) ABSTRACT

The present invention relates to a temperature sensor (1) for an engine of a vehicle, comprising: a casing (1) containing a circuit board (14) and traversed by at least one pair (2) of wires (3) provided with terminals (8), the terminal (8) being made up of a portion (804) crimped onto a conductor (5) arranged in the casing (1), a connector (101) comprising at least one metal insert (10) ensuring the electrical connection with the circuit board (14), where the casing comprises at least one flange (9) for holding the terminals (8), the terminals (8) being folded.

10 Claims, 7 Drawing Sheets

Figure 1:
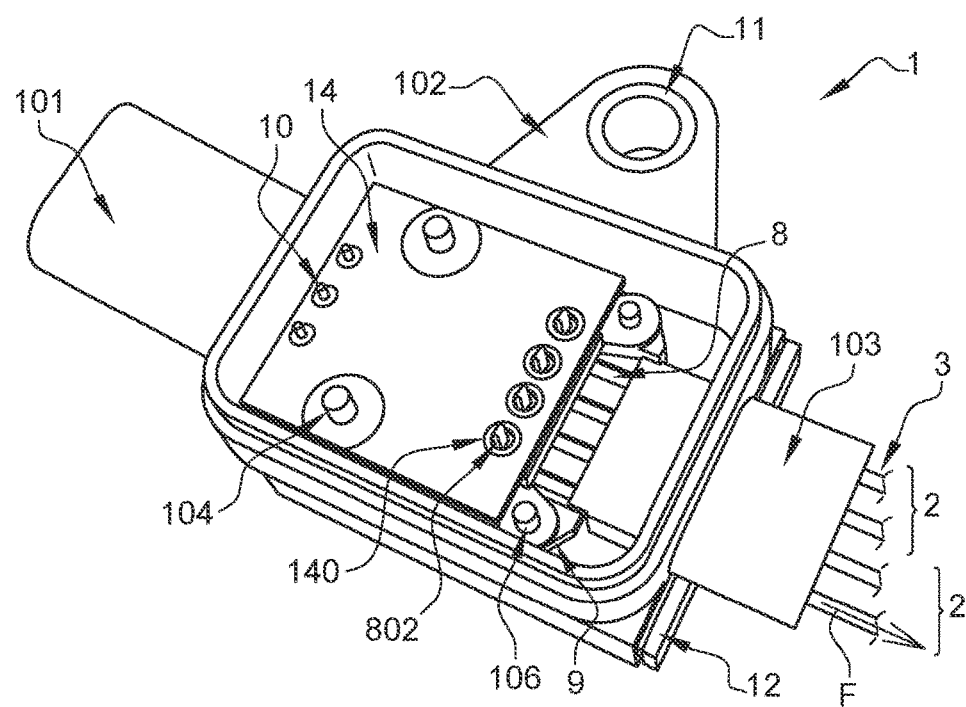

(51) Int. Cl.
*H01R 13/405* (2006.01)
*H01R 13/415* (2006.01)
*H01R 13/66* (2006.01)

(52) U.S. Cl.
CPC ......... *H01R 13/415* (2013.01); *H01R 13/665* (2013.01); *H01R 13/6658* (2013.01); *G01K 2205/00* (2013.01); *H01R 2201/20* (2013.01)

(58) Field of Classification Search
USPC .................... 439/741, 877, 246, 274, 275
See application file for complete search history.

(56) References Cited

U.S. PATENT DOCUMENTS

| | | | | |
|---|---|---|---|---|
| 7,090,547 | B2* | 8/2006 | Machida | H01R 13/04 |
| | | | | 439/825 |
| 8,905,783 | B2* | 12/2014 | Umemoto | H01R 33/965 |
| | | | | 439/587 |
| 2002/0111057 | A1* | 8/2002 | Bernat | H01R 13/6315 |
| | | | | 439/246 |
| 2005/0112956 | A1* | 5/2005 | Tsugane | H01R 43/16 |
| | | | | 439/736 |
| 2015/0229038 | A1* | 8/2015 | Nagasaka | H01R 43/16 |
| | | | | 439/877 |

* cited by examiner

PROTECTIVE CASING FOR VEHICLE TEMPERATURE SENSOR

The present invention concerns a temperature sensor for an engine of a vehicle, and a method for production thereof. In particular, the invention concerns a thermocouple sensor.

Temperature sensors comprising a thermocouple for measuring high temperatures are widely used in the field of exhaust systems of internal combustion engines. The thermocouples provide a relatively high measurement accuracy. This is why they are used in this field, which has high requirements in terms of pollutant emission controls.

The measuring principle of thermocouples is based on the Seebeck effect, which is reflected in a potential difference between two different metallic wires when subjected to a temperature difference. The two metal wires are welded together at a first end, forming a hot junction (or hot point) intended to measure the temperature T1 of the environment to be measured, such as for example the temperature of the exhaust gases of an exhaust system. The two metal wires of the thermocouple also each have a second end, each connected to a voltmeter by a cold junction (or cold point) which is at a reference temperature T0.

This type of temperature sensor is known to comprise a printed circuit board (PCB) with an integrated circuit containing the voltmeter. The integrated circuit is an application-specific integrated circuit (ASIC) which is able to process the voltage signals in order to convert these into temperature. It is able to provide an analog or digital output signal and uses a digital protocol of the SENT (Single Edge Nibble Transmission) or PWM (Pulsed Width Modulation) or PSI (Peripheral Sensor Interface) type.

These temperature sensors of the prior art conventionally comprise a casing containing a printed circuit board on which several terminals are brazed. The terminals are crimped—and potentially welded—onto the metallic core of a multistrand wire. In the case of a thermocouple sensor, this connection is known as the cold junction. The metallic core of each wire is coated with an insulator. A silicone seal, also crimped onto the terminal, ensures the seal between this insulator and a frame comprising ribs which are re-melted during production of the casing by plastic injection moulding. The fusion of these ribs with the plastic material of the casing ensures the seal between the frame and the casing.

This type of sensor has several drawbacks. One of the drawbacks arises from an inadequate tightness of the casing because of imperfect fusion of the ribs in the plastic material of the casing. Another drawback is linked to the complexity of this type of sensor, which entails complicated production and a long installation time.

The object of the present invention is therefore to remedy this drawback of the prior art, by proposing a temperature sensor in which the tightness of the casing and the complexity of the sensor are improved.

For this, the present invention proposes a temperature sensor for an engine of a vehicle, comprising:
- a casing containing a circuit board and traversed by at least one pair of wires provided with terminals, the terminal being made up of a portion crimped onto a conductor arranged in the casing,
- a connector comprising at least one metal insert ensuring the electrical connection with the circuit board, characterized in that the casing comprises at least one flange for holding the terminals, the terminals being folded.

According to an embodiment of the invention, the flange is fixed to the casing via the plastic deformation of at least one support stud arranged in the casing.

According to an embodiment of the invention, the diameter of a stud is greater than or equal to 1.5 mm.

According to an embodiment of the invention, the flange is made of fibre-containing material, for example with a content of 45%, the fibre content of the flange being greater than that of the casing.

According to an embodiment of the invention, the flange comprises:
- a first portion formed by folding a sheet of a copper alloy, this first portion of the terminal being folded after insertion in the casing,
- an axial stop formed by a double fold of the sheet constituting this,
- a second portion crimped onto the conductor,
- a third portion crimped onto a wire sleeve.

According to an embodiment of the invention, the casing comprises a housing for the terminal with a reduction in cross-section ensuring the stoppage and guidance of the terminal.

According to an embodiment of the invention, a guide play with a height is left between the terminal and the flange, which is preferably equal to 0.05 mm and is equal to 3 mm.

According to an embodiment of the invention, the terminal is folded with an angle $\alpha$ selected such that the terminal is always in contact with the one of the sides of the flange, preferably this angle is between 1 and 3°.

According to an embodiment of the invention, the support zone of the flange is positioned on the casing so that it remains flat without pivoting.

The invention also concerns a method for production of a temperature sensor for an engine of a vehicle as defined by any of claims 1 to 10, wherein during assembly of the sensor, the terminals are inserted straight into the casing and then folded directly inside using a folding tool.

Figure 2:
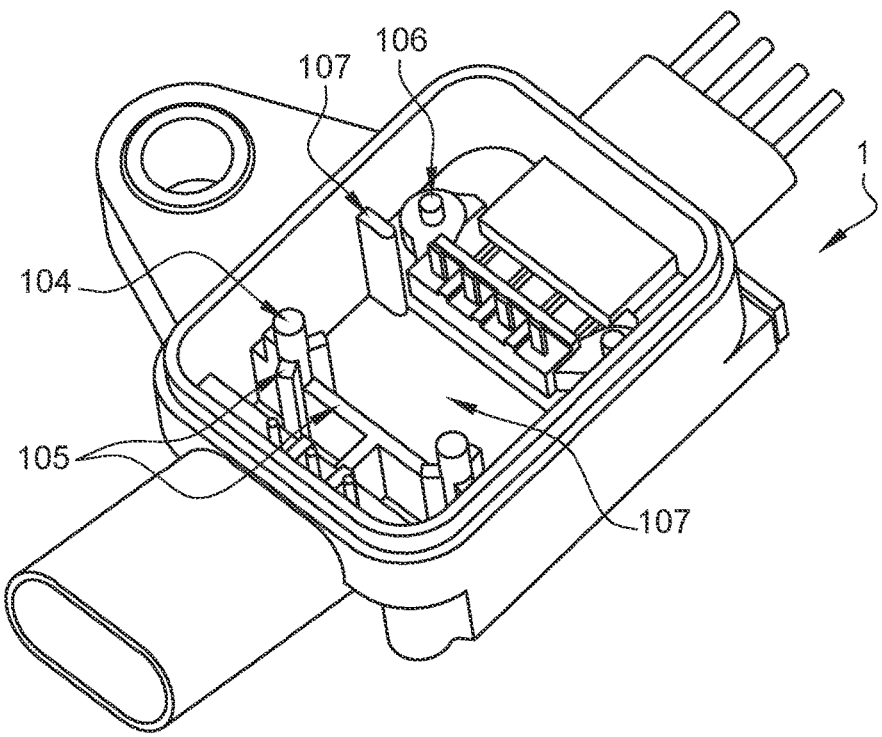
Figure 3:
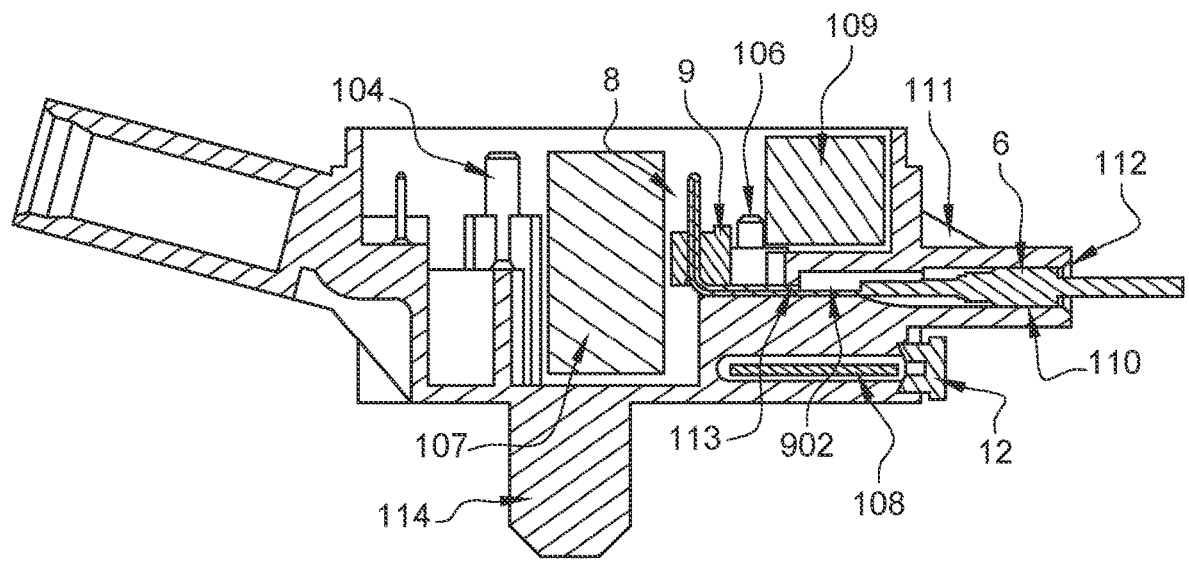
Figure 4:
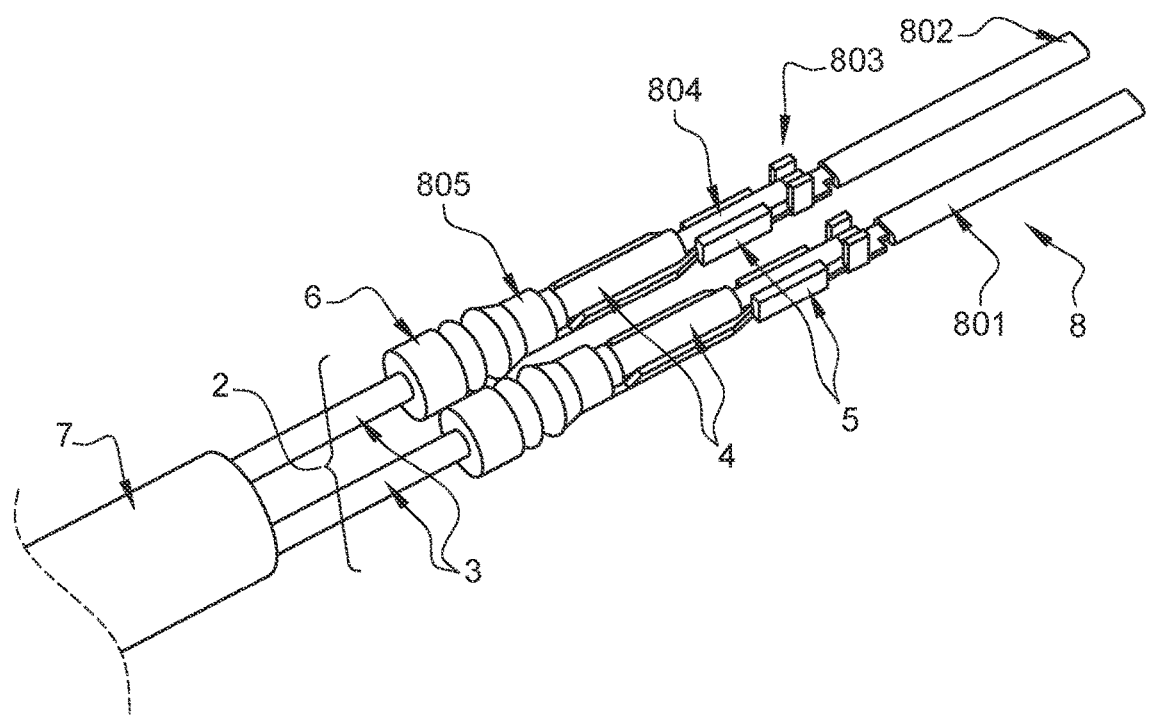
Figure 5:
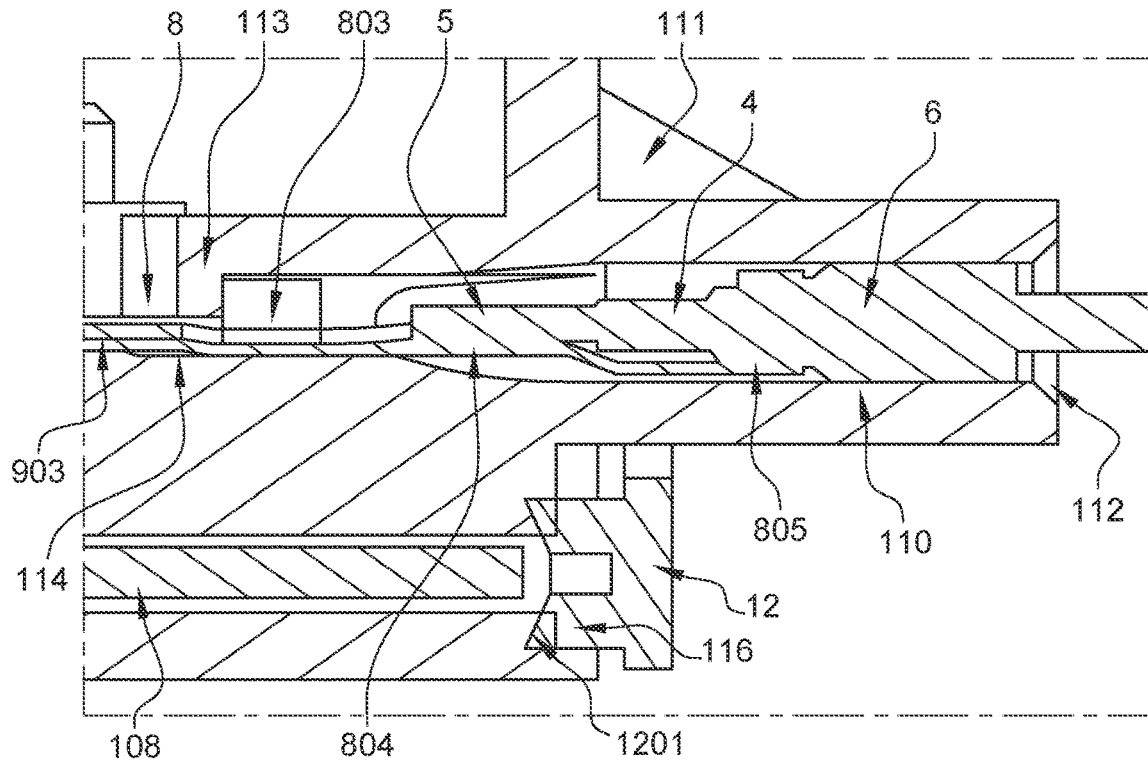
Figure 6:
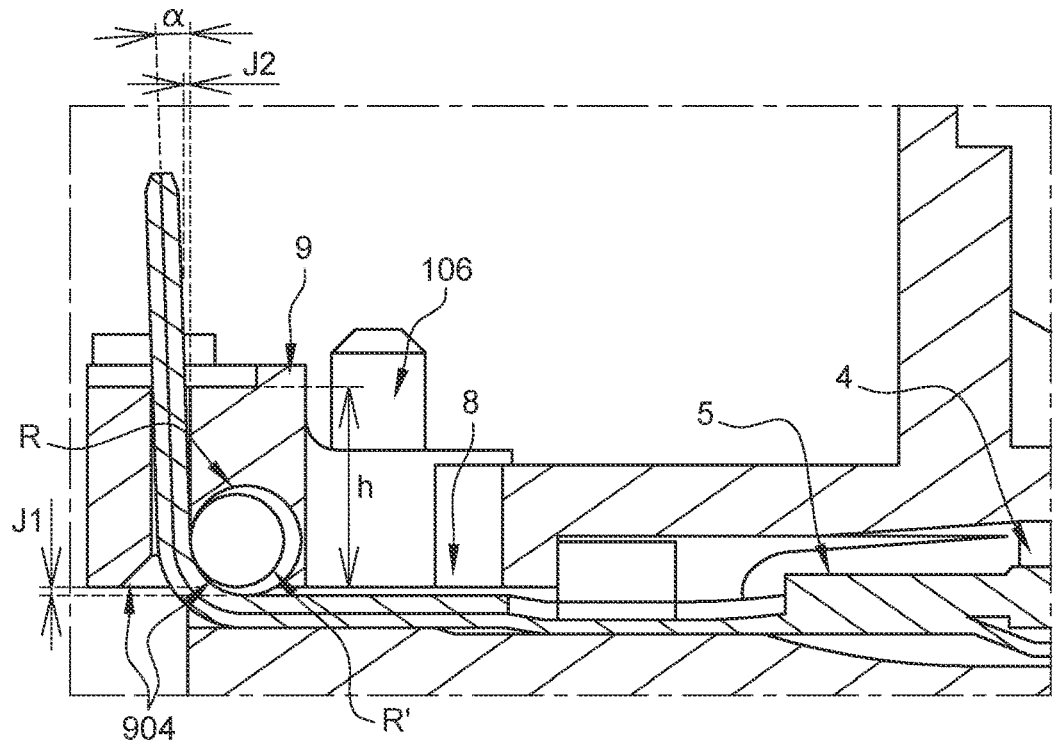
Figure 7:
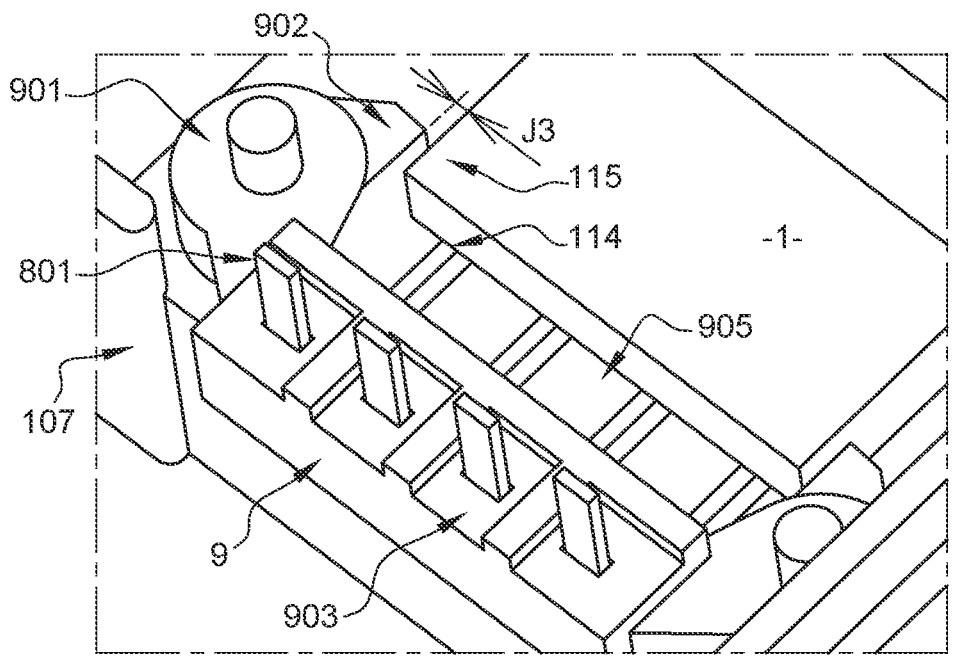
Figure 8:
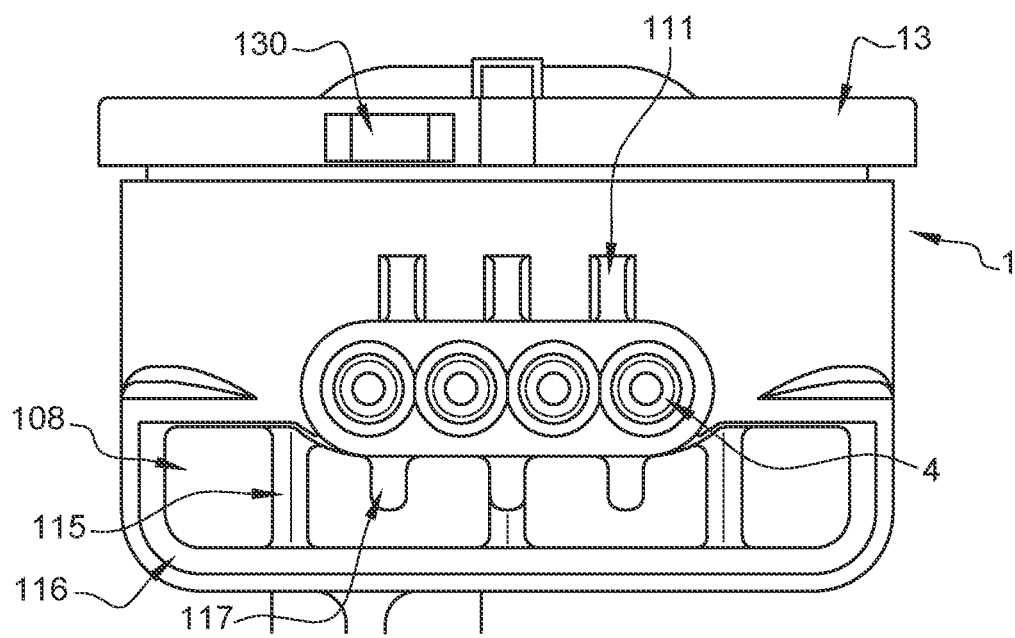
Figure 9:
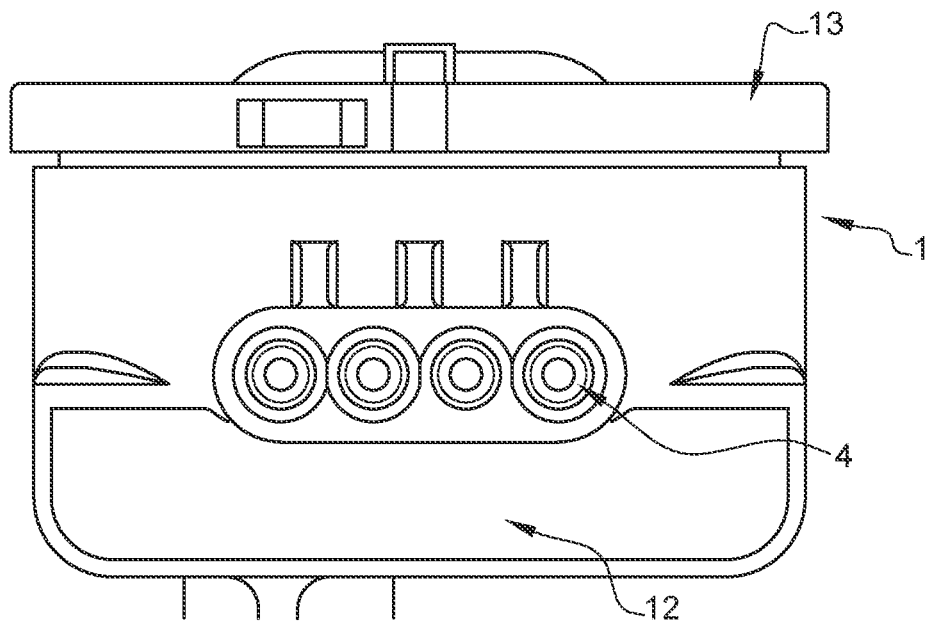
Figure 10:
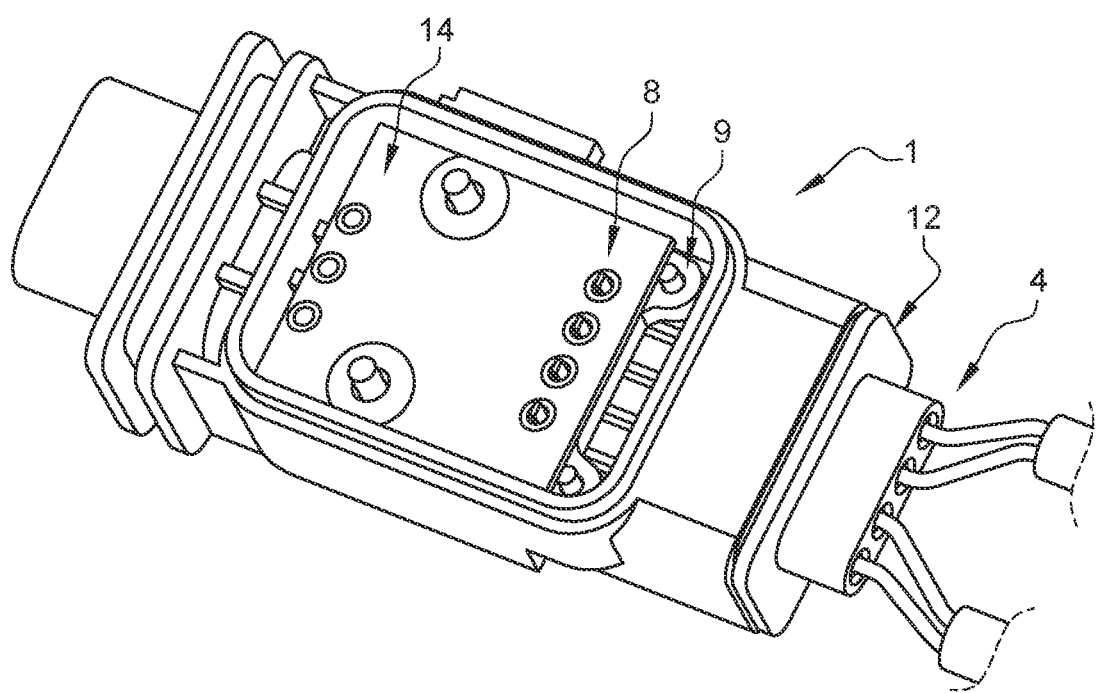
Figure 11:
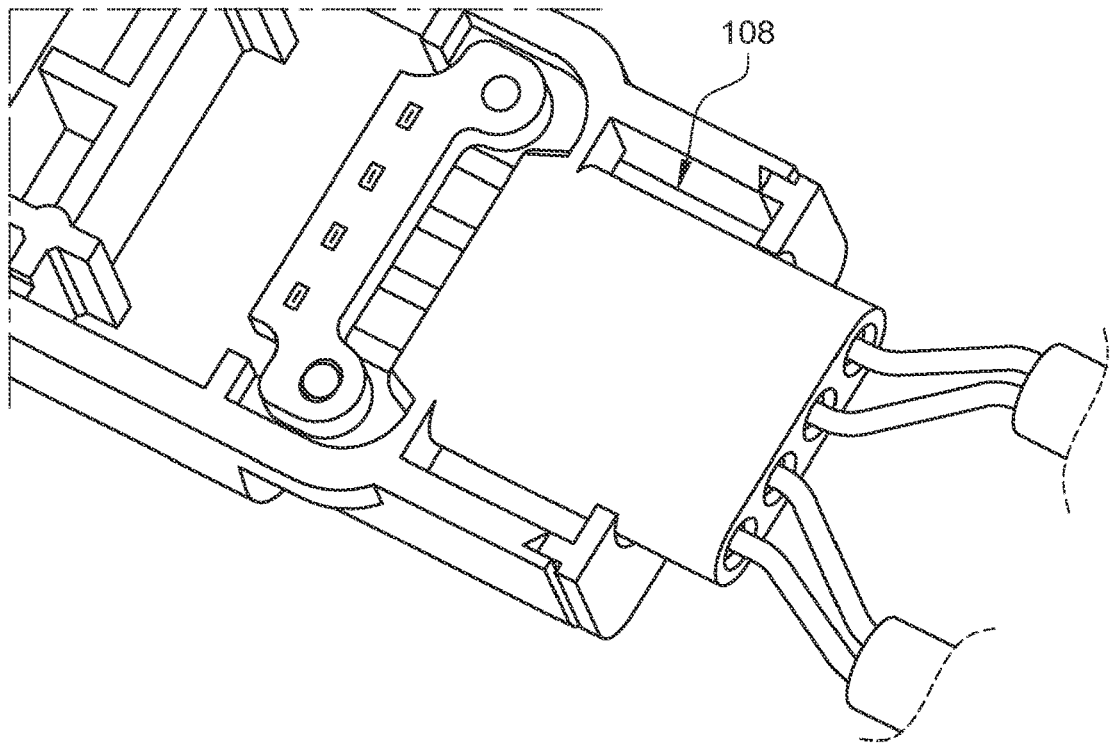
Figure 12:
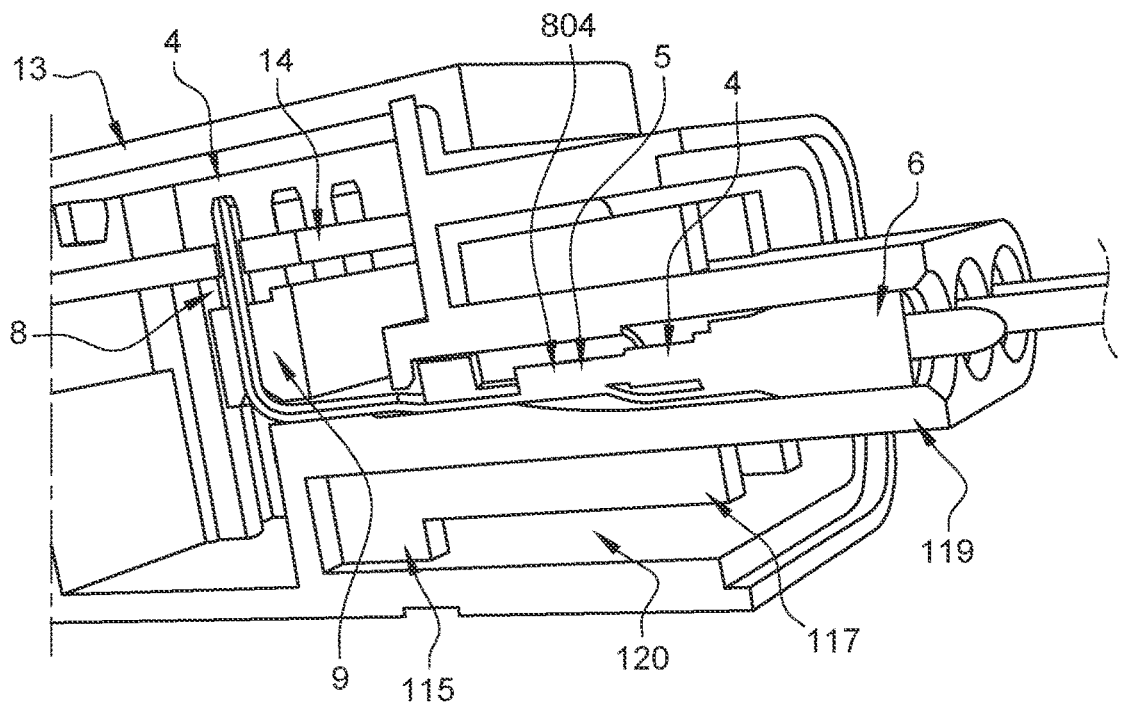
Figure 13:
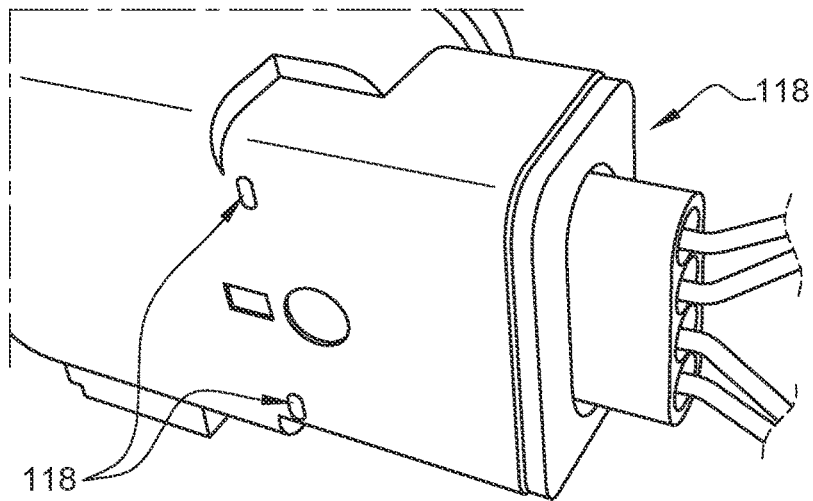
Figure 14:
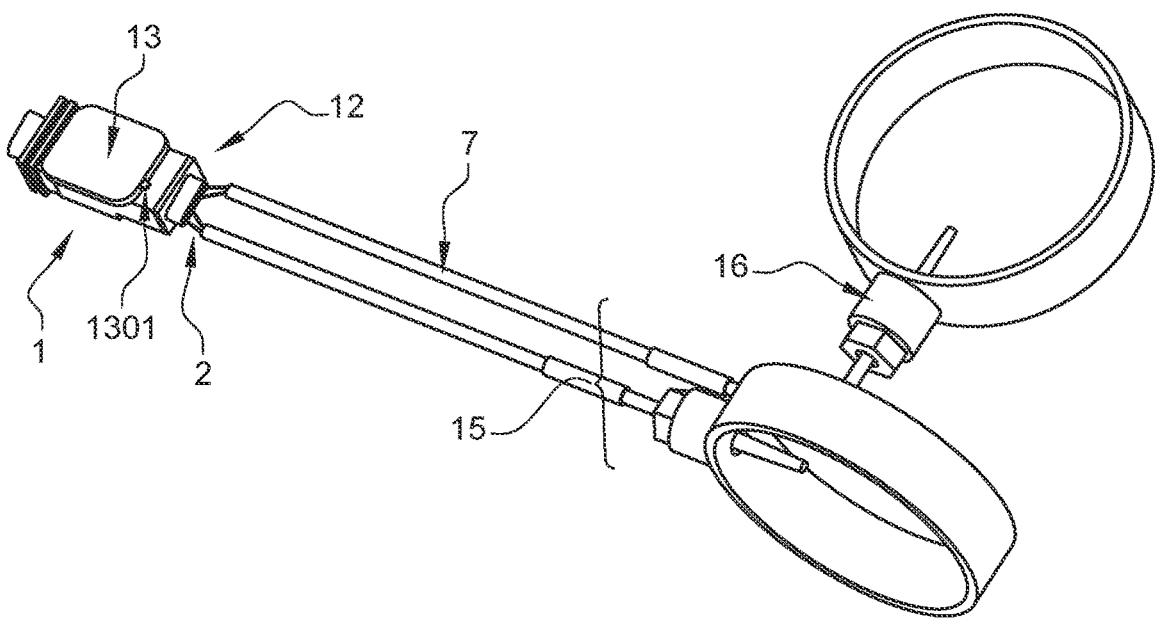

Further aims, features and advantages of the invention will be understood better and will become more clearly apparent from reading the description given below with reference to the appended figures, which are given by way of example and in which:

FIG. 1 is a depiction of an elevation view of a temperature sensor according to an embodiment of the invention, with PCB installed, FIG. 2 is a depiction of an elevation view of a temperature sensor according to an embodiment of the invention, without PCB installed, FIG. 3 is a schematic depiction of a longitudinal sectional view of a temperature sensor according to an embodiment of the invention, FIG. 4 is an elevation view of a part of a temperature sensor according to an embodiment of the invention, FIG. 5 is a schematic depiction of a cross-sectional view of a temperature sensor according to an embodiment of the invention, FIG. 6 is a schematic depiction of a cross-sectional view of a temperature sensor according to an embodiment of the invention, FIG. 7 is a depiction of an elevation view of a temperature sensor according to an embodiment of the invention, without PCB installed, FIG. 8 is a schematic depiction of a cross-sectional view of a temperature sensor according to an embodiment of the invention, without side cover, FIG. 9 is a schematic depiction of a cross-sectional view of a temperature sensor according to an embodiment of the invention, with side cover, FIG. 10 is a depiction of an elevation view of a temperature sensor according to another embodiment of the invention, with PCB installed, FIG. 11 is a depiction of an elevation view of a part of a temperature sensor according to another embodiment of the invention, without PCB installed, FIG. 12 is a schematic depiction of a cross-sectional view of a temperature sensor according to an embodiment of the invention, without side cover, FIG. 13 is a schematic depiction of an elevation view from below of a temperature sensor according to an embodiment of the invention, FIG. 14 is complete illustration of a temperature sensor according to an embodiment of the invention.

FIG. 1 shows the interior of a temperature sensor 1 for an engine of a vehicle according to the invention.

A vehicle in the context of the invention means any type of terrestrial vehicle, for example a car and a truck, or aerial vehicle.

The sensor according to the invention illustrated in FIGS. 1, 2 and 3, comprises a casing 1 containing a circuit board 14, also known as a PCB (printed circuit board). The casing 1 is traversed by at least one pair 2 of wires 3 fitted with terminals 8 and wire sleeve seals 6, both crimped. According to an embodiment of the invention, the material of the casing 1 is a thermoplastic, such as for example PA66, PA6, PBT, PPS or PPA. The casing 1 is made of a material with a fibre content, for example 30% fibres.

The circuit board 14 is arranged in the casing 1 and rests on several support zones 105. These support zones are formed around studs 104, 106. The studs 104, 106 are hot-deformed, for example by rivet heading, in order to to secure the board definitively. The position of the studs and their diameter are selected to ensure the robustness of the support of the board 14, in particular under vibrations. The studs 104, 106 for example each have a diameter greater than or equal to 2.5 mm. According to an embodiment of the invention, the studs 104, 106 are situated between the first third and the middle of the board, in order to limit vibrations.

The casing 1 comprises a connector 101 and at least one flange 102 for holding the terminals, with an over-moulded insert 11. The connector 101 comprises at least one metal insert 10, for example made of bronze or brass, ensuring the electrical connection with the circuit board 14.

As illustrated on FIGS. 9, 12 and 14, the casing 1 comprises a main cover 13. This cover encloses the casing 1 and thus protects the circuit board 14 from the external environment (humidity, pollution, liquid). This cover 13 is tightly fixed to the casing 1 by bonding, by vibration or by laser welding.

In the context of the invention as illustrated in FIGS. 2, 3 and 12, the flange 9 is fixed to the casing 1 via the plastic deformation of at least one support stud 106 arranged in the casing 1. According to an embodiment of the invention, the flange is fixed by two support studs 106. According to an embodiment of the invention, the diameter of a stud 106 is greater than or equal to 1.5 mm. This ensures sufficient mechanical strength for a tensile load F of 80 N on each wire 3.

According to an embodiment of the invention, the stud is deformed by melting of the plastic material of the stud by heating, which is known as rivet heading.

According to another embodiment of the invention, the stud is deformed by ultrasonic welding, for example between 20 and 30 kHz, Deformation by ultrasonic welding has the advantage of a short cycle time with no risk of fouling, and retains no residual play after the operation due to the shrinkage of the plastic after cooling. To achieve the ultrasonic welding, ribs 115 are provided in the casing 1. The ribs 115 shown on FIG. 8 are arranged parallel to the support stud 106, to avoid a collapse of the material of the casing 1.

According to an embodiment of the invention, the flange is made of a fibre-containing material, for example with a content of 45%. According to an embodiment of the invention, the fibre content of the flange is greater than that of the casing, thus avoiding collapse of the flange and creation of a residual play after operation. The material of the flange may be a thermoplastic such as PA66, PA6, PBT or PPA.

As illustrated in FIGS. 6 and 7, two support zones 901 receive the melted material of the support studs 106. An empty space 905 is provided between the two support zones 901. This empty space 905 allows insertion of tooling for pressing the terminals into the base of the casing before insertion of the flange 9. This guarantees a repeatable positioning of the terminals 8.

According to an embodiment of the invention, a seal is arranged in the empty space 905 formed by the flange 9 and the casing 1. This seal is a mono- or bi-component epoxy resin, or a mono- or bi-component gel. This seal ensures complete tightness between the conductor 5 and the insulation. No humidity may thus pass via the wires 3, by capillary action between the strands of the conductor and the insulation, as far as the measurement probes 15. This improves the precision and robustness of the product.

According to an embodiment of the invention, a play J3 is provided between the ribs 115 and the base 902 of the support 901, The play J3 is for example greater than or equal to 0.1 mm.

The flange 9 according to the invention performs two essential functions. The first is the precise and repeatable positioning of the ends of the folded terminals 802 in metallized holes provided in the circuit board 14. The second is to guarantee the tensile strength of the terminals 8 when a force F is exerted on the wires 3.

The terminal 8 illustrated, for example in FIG. 4, comprises a first portion 801 formed by folding a sheet of copper alloy. This first portion of the terminal is folded after insertion in the casing 1. The terminal also comprises a chamfered end 802 with coating selectively deposited over a few mm. The coating may be a sublayer of 0.5 to 5 µm of nickel (Ni) and a layer of 0.5 to 5 µm of tin (Sn) in order to promote brazing onto the circuit board 14, The coating is absent from the folding zone of the terminal 8, so as to limit the risk of incipient breakage and to allow compensation for cold temperature by the material of the substrate of the terminals 8 if the latter forms a thermocouple. A layer of nickel (or another conductive metal) on the surface balances the electrical loads generated by the thermocouple which forms the terminals (CuFe2P/CUNi10) and hence cancels the desired compensation. The aim of the chamfer is to facilitate insertion of the flange 9 after folding.

As illustrated on FIGS. 4 and 5, the terminal 8 consists of an axial stop (803) formed by a double fold of the sheet constituting this. This axial stop is designed to fix the insertion position of the terminal in its housing 110 in the casing 1. A reduction in clear cross-section 114 of the housing 110 ensures this stop on the terminal 8 at the same time as promoting guidance thereof in the folding tool (not shown).

As illustrated in FIGS. 4, 5 and 14, the terminal 8 comprises a second portion 804 crimped onto the conductor 5. According to an embodiment of the invention, in the case of a thermocouple sensor, laser welding is performed in order to reduce the risk of shrinkage of the electrical contact. This second portion 804 for example has a nickel coating (Ni) approximately 0.5 to 5 μm thick, to facilitate laser welding. This second portion is also called the cold junction of the thermocouple.

The terminal also comprises a third portion 805 crimped onto a wire sleeve 6 for mechanical support thereof. Behind the sleeve, the wires 3 are arranged in pairs 2 and are protected by a sheath 7, for example made of glass fibre and silicone. At another end of the wire pair are the temperature sensors. The temperature sensors are fixed to bosses 16 of the equipment or pipe to be measured.

According to an embodiment of the invention, in the case of a thermocouple sensor, the terminal is made of a low alloy copper such as CuFe2P for the positive pole and a cupronickel such as CuNi10 for the negative pole. This copper alloy in raw form takes the form of a sheet of thickness 0.2 to 0.4 mm.

According to an embodiment of the invention illustrated in FIGS. 3 to 5, the casing comprises a chamfer 112 to facilitate insertion of the sleeve 6.

In the context of the invention, on assembly of the sensor, the terminals 8 are inserted straight into the casing 1 then folded directly inside using a folding tool, such that no over-moulding is necessary.

The casing 1 comprises a clear space 107 such that a tool for folding the terminals 8 can be introduced into the casing 1. After folding, the tool is withdrawn and leaves space for the flange which will definitively secure the terminals.

To ensure the two functions of the terminal described above (end positioning on the circuit board and tensile strength), several geometric parameters and materials are necessary.

In the context of the invention, a guide play J2 with a height h is left between the terminal 8 and the flange 9. According to an embodiment of the invention, the ratio J2/h is minimized. For example, J2 is equal to 0.05 mm, and the height is equal to 3 mm. Minimizing this ratio promotes both desired functions.

In the context of the invention, the terminal is folded with an angle α selected such that the terminal 8 is always in contact with the one of the sides of the flange. This angle is for example between 1 and 3°. With privileged contact always on the same side of the flange, the positioning spread of the end of the terminal 802 in the metallized hole of the circuit board 1401 is minimized.

In the context of the invention, the support zone of the flange 9 is positioned on the casing 1 below the zone 901, so that it remains flat without pivoting. For this, the play J1 between the flange 9 and the terminals 8 is different from zero, and is for example equal to 0.05 mm.

In the context of the invention, the zone for insertion of the terminals 8 in the flange 9 is facilitated at 904 by a chamfer on one side of the flange and a radius on the other side of the flange. In order not to damage the terminal 8, the terminal radius R is selected sufficiently large, for example 0.9 mm for a folded thickness of 0.5 mm. The radius on the flange R' lies within the radius of curvature of the terminal 8, so as not to damage it.

In the case of a thermocouple sensor, the air flow is supplied for example from the exterior air of the vehicle when the casing is not placed below the engine hood or in an isolated zone. In this configuration, one face of the casing is in contact with the engine between 50° C. and 150° C., and the opposite face sees a cold air flow between −40° C. and 10° C. This gradient between the outer faces of the casing 1 generates a gradient in the casing between the cold junction of the thermocouple 804 and the circuit board 14 containing the element which measures the cold temperature.

To limit this gradient, at least one air cavity 108 is provided between the cold junction 804 and the lower and side face of the case 1.

According to an embodiment of the invention, a second air cavity 109 is provided between the cold junction and the upper and side face.

These cavities 108, 109 act as thermal insulation and allow a gain of around 10° in the temperature difference for an exterior gradient of 100° C.

As illustrated in FIGS. 3, 4 and 5, the first cavity 108 is closed by a side cover 12 so as to avoid any flow of air into this zone. According to an embodiment, the cover 12 is tightly fixed to the casing 1. The side cover 12 is for example fixed by ultrasonic welding (20 to 30 kHz) with a rapid cycle time. For this, energy vectors 1201 are provided on the inner face of the side cover 12, and are melted and mixed with the material of the casing 1.

According to an embodiment of the invention, the side cover 12 is formed from the same material as the casing 1. The casing 1 comprises internal ribs 117 and support zones 116 formed at the end of the wall of the casing 1, which allows balancing of the welding over the entire periphery of the cover 12. The internal ribs 117 are arranged in the lower part of the casing 1 below the cold junction 804. The casing comprises at least two holes 118 formed below the casing 1 for the escape of water which could be retained in the first cavity 108.

According to an embodiment of the invention, the casing comprises additional ribs 111 which provide a better rigidity of the casing 1. These additional ribs 111 are arranged in the upper part of the casing 1.

In the context of the invention, the upper and lower parts of the casing, and in general all references to a positioning direction, are defined with respect to the face of the casing 1 comprising the main cover 13, which is considered to be the upper face of the sensor.

According to another embodiment of the invention illustrated in FIGS. 6, 7, 8 and 9, the first cavity 108 and second cavity 109 are linked so as to form a single cavity 120. This cavity 120 surrounds the cold junction 804. In this configuration, the casing 1 also comprises internal ribs 117 and additional ribs 111, the purpose of which is to strengthen the cold junction, and which also serve to balance the welding of the side cover 12.

The scope of the present invention is not limited to the details given above and allows embodiments in numerous other specific forms without moving away from the field of application of the invention. Consequently, the present embodiments should be considered to be by way of illustration, and can be modified without however departing from the scope defined by the claims.

The invention claimed is:

1. A temperature sensor for an engine of a vehicle, comprising:
  a casing containing a circuit board and traversed by at least one pair of wires provided with terminals, each terminal being made up of a portion crimped onto and above a conductor arranged in the casing, a connector comprising at least one metal insert ensuring the electrical connection with the circuit board,
  wherein the casing comprises at least one flange for holding the terminals, the terminals being folded, and wherein a seal is arranged in an empty space formed by the at least one flange and the casing, the seal ensuring complete tightness between the conductor and an insulation formed on the at least one pair of wires, wherein no humidity passes via the at least one pair of wires, by capillary action between strands of the conductor and the insulation.

2. The temperature sensor as claimed in claim 1, wherein the flange is fixed to the casing via the plastic deformation of at least one support stud arranged in the casing.

3. The temperature sensor as claimed in claim 2, wherein a diameter of the stud is greater than or equal to 1.5 mm.

4. The temperature sensor as claimed in claim 1, wherein the flange is made of fibre-containing material with a content of 45%, the fibre content of the flange being greater than that of the casing.

5. The temperature sensor as claimed in claim 1, wherein the each terminal comprises:
- a first portion formed by folding a sheet of a copper alloy, this first portion of the terminal being folded after insertion in the casing,
- an axial stop formed by a double fold of the sheet constituting this,
- a second portion crimped onto the conductor,
- a third portion crimped onto a wire sleeve.

6. The temperature sensor as claimed in claim 1, wherein the casing comprises a housing for the terminal with a reduction in cross-section ensuring the stoppage and guidance of the terminal.

7. The temperature sensor as claimed in claim 1, wherein a guide play with a height is left between the terminal and the flange, wherein the guide play is equal to 0.05 mm and the height is equal to 3 mm.

8. The temperature sensor as claimed in claim 1, wherein the terminal is folded with an angle selected such that the terminal is always in contact with the one of the sides of the flange, and wherein the angle is between 1 and 3°.

9. The temperature sensor as claimed in claim 1, wherein a support zone of the flange is positioned on the casing so that it remains flat without pivoting.

10. A method for production of a temperature sensor for an engine of a vehicle, the method comprising:
- during assembly of the temperature sensor, inserting terminals of at least one pair of wires straight into a casing; and
- folding the terminals directly inside the casing using a folding tool,
- wherein the temperature sensor comprises the casing containing a circuit board and traversed by the at least one pair of wires provided with the terminals, the terminals being made up of a portion crimped onto and above a conductor arranged in the casing, a connector comprising at least one metal insert ensuring the electrical connection with the circuit board,
- wherein the casing comprises at least one flange for holding the terminals,
- wherein a seal is arranged in an empty space formed by the at least one flange and the casing, the seal ensuring complete tightness between the conductor and an insulation formed on the at least one pair of wires,
- wherein no humidity passes via the at least one pair of wires, by capillary action between strands of the conductor and the insulation.

* * * * *